US008901180B2

(12) United States Patent
Jonckheere et al.

(10) Patent No.: US 8,901,180 B2
(45) Date of Patent: Dec. 2, 2014

(54) METHOD FOR FUNCTIONALISING A THERMOSET, CROSSLINKED ISOCYANATE-BASED POLYMERIC SOLID MATERIAL

(75) Inventors: Laura Jonckheere, Wetteren (BE); Filip Du Prez, Ghent (BE); Thu Nguyen, Ghent (BE)

(73) Assignee: Recticel, Brussels (BE)

( * ) Notice: Subject to any disclaimer, the term of this patent is extended or adjusted under 35 U.S.C. 154(b) by 0 days.

(21) Appl. No.: 13/470,567

(22) Filed: May 14, 2012

(65) Prior Publication Data

US 2012/0289621 A1 Nov. 15, 2012

(30) Foreign Application Priority Data

May 12, 2011 (EP) .................... 11165938

(51) Int. Cl.
*C08F 8/34* (2006.01)
*C08F 281/00* (2006.01)
*C08F 283/00* (2006.01)
*C08G 18/82* (2006.01)
*C08J 9/04* (2006.01)

(52) U.S. Cl.
USPC ................ 521/53; 521/54; 521/55; 522/90; 525/452; 525/453; 525/459

(58) Field of Classification Search
USPC ........... 521/53, 54, 55; 522/90; 525/452, 453, 525/459
See application file for complete search history.

(56) References Cited

U.S. PATENT DOCUMENTS

| | | | | |
|---|---|---|---|---|
| 2,808,391 | A * | 10/1957 | Pattison | 528/75 |
| 6,177,523 | B1 * | 1/2001 | Reich et al. | 525/459 |
| 6,855,739 | B2 * | 2/2005 | Becker et al. | 521/92 |
| 8,308,699 | B2 * | 11/2012 | Zhang et al. | 604/265 |
| 2009/0023831 | A1 * | 1/2009 | Miyata et al. | 522/97 |
| 2010/0234482 | A1 * | 9/2010 | Du Prez et al. | 521/159 |

FOREIGN PATENT DOCUMENTS

| | | |
|---|---|---|
| DE | 10003157 A1 | 8/2001 |
| EP | 0379246 B1 | 8/1994 |
| EP | 0929586 B1 | 4/2001 |
| WO | 200900892 A2 | 12/2008 |

OTHER PUBLICATIONS

Ferris et al., L-Arabinitol-Based Functional Polyurethanes, Journal of Polymer Science Part A: Polymer Chemistro, 2011, vol. 29, pp. 1147-1154.
D. Achilias, A Review of Modeling of Diffusion Controlled Poly Merization Reactions, Macromolecular Theory and Simulations, 2007, 16, pp. 319-347.
Mercier et al., Preparation and Functionalization of (Vinyl)polystyrene PolyHIPE, Reactive and Functional Polymers, 2000, 46, pp. 67-79.
Mercier et al., Thiol Addition to the Pedant Vinylbenzene Groups of (Vinyl)polystyrene PolyHIPE Via a Batch and a Cross-Flow Method, Macromolecular Chemistry and Physics, 2001, 202, pp. 2672-2680.
Deleuze et al., Development of a New Ultraporous Polymer as Support in Organic Synthesis, Bioorganic & Medicinal Chemistry Letters, 2002, 12, pp. 1877-1880.

* cited by examiner

*Primary Examiner* — Rabon Sergent
(74) *Attorney, Agent, or Firm* — Sughrue Mion, PLLC

(57) ABSTRACT

The invention relates to a method for functionalizing a thermoset, crosslinked isocyanate-based polymeric solid material which is made of isocyanate and isocyanate reactive components, at least one of which comprises an anchor component which has at least one anchor group. The anchor groups on the solid material are formed by terminal alkene and/or alkyne groups. To functionalize this polymeric solid material it is brought in contact with a solution which contains at least one functional component. This functional component comprises at least one thiol group and is allowed to bind covalently to the polymeric solid material by a free-radical addition reaction between the thiol groups on the functional component and the terminal alkene and/or alkyne anchor groups on the undissolved solid material. An effective functionalization of the polymeric material can thus be achieved notwithstanding the heterogeneous reaction conditions.

27 Claims, No Drawings

METHOD FOR FUNCTIONALISING A THERMOSET, CROSSLINKED ISOCYANATE-BASED POLYMERIC SOLID MATERIAL

The present invention relates to a method for functionalising a thermoset, crosslinked isocyanate-based polymeric solid material, in particular a polyurethane, a polyurea or a polyurea modified polyurethane material, which material is made of isocyanate and isocyanate reactive components, at least one of which comprises an anchor component which has at least one anchor group. To functionalise the solid material, this material is brought in contact with a liquid containing at least one functional component which is allowed to bind covalently to the solid material by a heterogeneous reaction between the functional component contained in said liquid and the anchor groups on the solid, undissolved material. The invention also relates to the isocyanate-based polymeric, crosslinked solid material which is functionalised by this method.

The production of isocyanate-based polymeric materials, in particular polyurethane materials, by reaction of polyisocyanates with components containing at least two isocyanate reactive hydrogen atoms is well known. Polyurethane materials can be produced as beads, sheets, fibres, coatings, elastomers, gels but in particular, they may be produced as cellular polymers, such as foams, by adding a blowing agent to the polyurethane reactive mixture. The cellular properties of such polyurethane materials may vary from a microcellular product to a highly expanded foam, whereby the cells may be closed or open by proper selection of the amount and type of reactive components, cell control agents, blowing agent and foaming technology. Polyurethane materials have gained a wide interest due their high abrasion resistance, their high flexibility, their high chemical resistance and their excellent mechanical properties, which makes them suitable for a wide range of applications. The targeted applications are numerous among which in the field of automobile, medicine, comfort, buildings, paintings, coatings, adhesives.

In many applications, the polyurethane material is used as a carrier material to which a functional component, which adds an additional functional property to the polyurethane material, is immobilised. Such polyurethane materials are hereinafter referred to as functionalised polyurethanes. Typical examples of functional components are for example dyeing agents, disinfecting agents, ion exchange materials, biologically active materials (for example enzymes), catalysts, cosmetic agents, therapeutic agents, deodorising agents, antioxidising agents, scenting agents, complexing agents, cleaners, . . . . Such functionalised polyurethanes offer a lot of additional advantages and hence enlarge the application field of polyurethane materials. The immobilisation of functional components on a polymeric carrier makes it for example possible to use the functional component in a continuous flow process, for example in a water filtration process or in a biotransformation process.

Different methods are known to immobilise functional components onto a polyurethane material. A first method is known as adsorption. In this method, the immobilisation is based upon non-specific physical interactions between the functional component and the surface of a solid polyurethane material. Such immobilisation can for example be obtained by impregnating the polyurethane material with a solution of the functional component. Due to the weak forces however, the functional component can be desorbed over the period of use (i.e. leaching-out), so that the polyurethane material will lose its functionality.

A significantly more stable immobilisation is obtained by directly adding the functional component to the reactive mixture for producing the polyurethane material. The functional component has one or more groups which are reactive towards one or more of the reaction components so that it is built in the polymer structure. Such an immobilisation technique is for example described in U.S. Pat. No. 6,855,739 B2. In the described process, poly(ethyleneimine), which is known for its complexing activity towards heavy metal ions and dyes, is added to the polyurethane foam reaction mixture. Although this method offers the important advantage that no post-treatment is needed, this method still suffers from several drawbacks. First of all, due to the high exothermic conditions of most polyurethane polymerisation processes, the functional component can undergo degradation, thereby decreasing its activity. Heat-sensitive functional components are thus not qualified for this immobilisation technique. Secondly, compatibility problems may arise when adding the functional component to the polyurethane reaction mixture. Furthermore, the functional component can interfere with the polyurethane reaction, for example in the case the functional component has isocyanate reactive groups such as hydroxyl or amine groups, as is the case with poly(ethyleneimine) in U.S. Pat. No. 6,855,739B2. Due to the high reactivity of these groups towards the —NCO groups of the isocyanates, this interference can lead to a less controlled polymerisation process of the polyurethane, as well as to a decreased activity of the functional component. In case the functional component does not have isocyanate reactive groups or other functional groups leading to a chemical bond with the polyurethane reactive mixture, the functional component won't be covalently bound to the polyurethane backbone, leading to leaching out of the functional component as a function of time and hence to a decreasing activity of the functionalised polyurethane foam.

An improvement of the method as described in U.S. Pat. No. 6,855,739B, is disclosed in DE 10003157A1. In a first step of the disclosed method, an anchor component having at least one functional group which is isocyanate reactive, and an anchor group which is a halogen, a carbonyl group, an ester group, an anhydride group, an epoxide group or a sulfon group, is added to the polyurethane reactive mixture and this reactive mixture is allowed to foam. In a next step, the cured foam is treated with a functional component ("active substance"), whereby a covalent bond is formed between this functional component and said anchor group of the anchor component. This process leads to an indirect bond of the functional component to the polyurethane material through the anchor component, thereby avoiding interference of the functional component with the polyurethane reactive mixture, and secondly, avoiding leaching out of the functional component.

An improvement of the method as described in DE 10003157A1 is disclosed in WO 2009/000892A2. This international patent application describes an isocyanate-based polymeric material which comprises terminal anchor groups, in particular terminal alkyne groups, which do not interfere with the polymerisation process of the polymer and which are such that a vast range of functional components can be bound covalently to said polymeric material through a Huisgen 1,3-dipolar cycloaddition reaction. Although said Huisgen reaction is known as the most powerful so-called click reaction, this reaction requires the use of a Cu catalyst, making the functionalisation of the polymeric material very expensive. A further disadvantage is that use is made of azide group containing components, which requires special safety measures for industrial applicability of the functionalisation method.

The object of the present invention is to provide a new method for functionalising a thermoset isocyanate-based polymeric solid material which comprises terminal anchor groups, without requiring the use of a catalyst or the use of azide group containing components.

To this end, the method according to the present invention is characterised in that the anchor groups on the polymeric solid material comprise terminal alkene and/or alkyne groups and said functional component comprises at least one thiol group, said functional component being allowed to bind covalently to said solid material by a heterogeneous, free-radical addition reaction between the thiol groups on the functional component and the terminal alkene and/or alkyne anchor groups on the undissolved, solid material.

The thiol-ene or thiol-yne free radical addition reaction which is used in the method of the present invention, involves two steps: an initial addition of the thiyl radical to the carbon of an -ene or -yne functionality and a subsequent hydrogen abstraction from a thiol group by a carbon-centered radical to give a thiyl radical. The reaction can be initiated both thermally and photochemically. The general thiol-ene coupling reaction mechanism is as follows:

Initiation

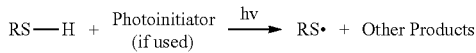

Propagation

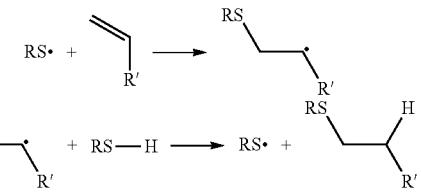

Termination

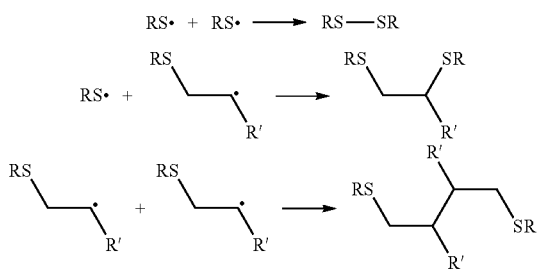

Although such radical thiol-ene/thiol-yne reactions are known to be particularly useful for polymer synthesis and post-modification as well as network formation (curing reactions), limitations in employing this chemistry in some cases, for instance for macromolecular coupling, have also been addressed. Frequently, side reactions including thiol air-oxidation into disulfide and radical-radical combinations terminating the reaction cycle accompany the thiol-ene/thiol-yne reactions.

Ferris et al. disclose the preparation of L-arabinitol-based functional polyurethanes (see Cristina Ferris, M. Violante De Paz, A. Galbis, *Journal of Polymer Science Part A: Polymer Chemistry*, Vol. 49, 1147-1154 (2011)). A linear soluble thermoplastic polyurethane with multiple terminal allyl groups is first synthetized by polyaddition reaction of a diol containing allyl groups, in particular 2,3,4-tri-O-allyl-L-arabinitol, with 1,6-hexamethylene diisocyanate. This PU material is subsequently dissolved in a solvent and functionalised by means of the thiol-ene addition reaction, i.e. in a homogeneous reaction system, under Argon atmosphere to avoid oxidation of the thiol groups. Under such homogeneous reaction conditions, complete conversion of all the allyl moieties could be achieved after 24 hours at a temperature of 80° C.

The isocyanate-based polymeric material which is to be functionalised in the method of the present invention is however a thermoset polymeric material, which can thus not be dissolved, due to the fact that its polymeric chains are crosslinked. Functionalisation of such thermoset material needs to be performed onto the solid polymeric material, i.e. in a heterogeneous reaction system.

It is well-known that said thiol-ene addition reaction renders low conversions in case of heterogeneous chemical reactions which are diffusion-controlled (see D. S. Achilias, *Macromolecular Theory and Simulations* 2007, 16, 319). This is not only due to diffusion restrictions between the functionalisable sites on the solid phase and the thiol reactant in solution, but also due to termination reactions caused by radical-radical couplings, intrinsically owing to the "short life-time" of thiyl and initiator-derived radicals, and to the atmospheric oxidation of thiol. Especially, for thiol functionalisation reactions of alkene/alkyne group-bearing crosslinked networks, such as crosslinked foams or elastomers, diffusion of reagents to the "inner" reacting sites can be much more hindered.

The diffusion restrictions, occurring when the functionalisation is a heterogeneous reaction, are much more significant in radicalar functionalisation reactions than in non radicalar reactions, such as the Huisgen 1,3-dipolar cycloaddition reaction. In the latter, the diffusion restriction only results in the reduction of the overall reaction rate. However, in radicalar functionalisation reactions, such as the free radicalar thiol-ene radicalar addition, under normal and especially non-deoxygenation conditions, as expected by a skilled man, these diffusion restrictions also give rise to reaction "quenching" as a result of radical-radical combinations, influencing the initiation and propagation reactions, as well as of thiol oxidation.

Examples of the use of the thiol-ene/thiol-yne radical addition chemistry for surface functionalisation include surface modification of microspheres, nanoparticles, resin beads, polymer brushes, solid celluloses and ultraporous emulsion-derived (vinyl)polystyrene-based foams. The last is the only example so far, to the best of the present inventors' knowledge, of thiol-ene functionalisation of a foam material. However, even though with the use of excess thiols and vacuum freeze-drying to remove atmospheric oxygen, with or without an applied low pressure for forcing reactants to flow through the porous structure, after 48 h of reaction time, the conversions of the vinyl groups of the (vinyl)polystyrene-based foams were moderate: 10-40% with aliphatic and aromatic thiols and 40-70% only with highly reactive thiols (such as mercaptoethanol, thioglycolate, mercaptopropionic acid, thioacetic acid) (see (a) A. Mercier, H. Deleuze, O. Mondain-Monval, *Reactive and Functional Polymers* 2000, 46, 67; (b) A. Mercier, H. Deleuze, O. Mondain-Monval, *Macromolecular Chemistry and Physics* 2001, 202, 2672; and (c) H. Deleuze, B. Maillard, O. Mondain-Monval, *Bioorganic & Medicinal Chemistry Letters* 2002, 12, 1877).

The side reactions including oxidation by air of the thiol groups into disulfide, and radical-radical combinations terminating the reaction cycle are thus well-known, especially in heterogeneous reaction systems, and are not desired at all. A skilled person would thus not use this specific reaction for functionalising a solid material with a liquid solution of the functional component, such as in the present invention.

According to the present invention, it has however been found surprisingly that these undesired side reactions can be reduced to a large extent. It has more particularly been found that it is possible to resolve the problem of reaction "quenching" attributed to diffusion-controlled radical thiol-ene/thiol-yne reactions in functionalisation of crosslinked solid materials, such as polyurethane foams and elastomers, resulting in a high functionalisation efficiency. Especially, because one alkyne group reacts with two thiol molecules, for the same full conversion of the alkene/alkyne groups, the use of the thiol-yne chemistry gains two times more content of functionality than the other reactions such as the alkyne-azide Huisgen cycloaddition or Diels-Alder reaction.

In a preferred embodiment of the method according to the present invention, use is made to this end of a reducing agent, in particularly a disulfide reducing agent, which is contained in the solution of the functional component. An advantage of the use of such a disulfide reducing agent is further that the reaction can be performed without the need to remove atmospheric oxygen.

In a further preferred embodiment of the method according to the present invention said free radical addition reaction is performed at a temperature of between 30° C. and 50° C., preferably at a temperature of between 35° C. and 45° C. It has been found that a minimum temperature of 30° C., preferably of 35° C., is required to initiate the reaction due to the required diffusion of the functional component to reach the anchor groups in the polymeric material. By using a temperature which is not higher than 50° C., preferably not higher than 45° C., the side reactions can be kept under control, especially in the presence of the disulfide reducing agent.

The anchor groups used in the method of the present invention are unsaturated groups which do not react during the polymerization process but which are suitable for binding said functional component to the polymeric material by the thiol-ene or thiol-yne radicalar addition reaction.

Due to the ease by which a thiol group can be generated on almost any molecule, the current invention undoubtedly broadens the range of functional components to be immobilised on the polymeric material. Furthermore, in contrast to azide group containing functional components, these thiol compounds do not require special safety measures.

The isocyanate-based polymeric solid material used in the method of the present invention is made of isocyanate and isocyanate reactive components, at least one of which comprises an anchor component which contains at least one terminal alkene and/or alkyne anchor group. In this way, the anchor component is built in the polymer backbone structure.

The isocyanate-based polymeric material used in the method of the present invention may either be a foam or an elastomer. It may in particular have a density higher than 400 $kg/m^3$, and it may more particularly be a non-cellular or micro-cellular elastomeric material. To enhance the diffusion of the functional component into the solid polymeric material and hence the access of the functional component to the anchor groups, this polymeric material has preferably a density lower than 400 $kg/m^3$ and it is more preferably an open-cell foam. The open cell foam has in particular an open cell content of at least 90%, preferably of at least 95%. It has been found that in such a foam most of the alkene/alkyne anchor groups can be converted by reaction with the functional component. In a preferred embodiment, this open-cell foam material has a cell size, determined according to the Visiocell method as disclosed in WO2007/031517, of at least 0.2 mm, preferably of at least 0.4 mm and more preferably of at least 0.6 mm. Such relatively large cell sizes enable an efficient diffusion of the functional component into the foam material.

As to the disulfide reducing agents which can be used in the method of the present invention, several useful disulfide reducing agents are described in the literature such as borohydrides (e.g. sodium or zirconium borohydrides), sodium bisulfite, tertiary phosphines (e.g. tri-n-butylphosphine, triphenylphosphine, dimethylphenylphosphine, tris(2-carboxyethyl)phosphine hydrochloride) and thiols (e.g. dithiothreitol, 2-mercaptoethanol).

Preference is given to tertiary phosphines, especially in the presence of a trace of water (present in the solvents and the moisture), as thiol-independent reducing agents due to their high reducing capacities and mild reaction conditions required. The capacities of different tertiary phosphines including tri-n-butylphosphine, triphenylphosphine and tris (2-carboxyethyl)phosphine) hydrochloride in inhibiting disulfide formation have been experimentally tested and under the conditions used, these phosphine-based reducing agents are efficient. Tri-n-butylphosphine was used in most experiments since it appeared to be the most effective disulfide reducing agent among the tested ones and is in a liquid form and well miscible with many organic solvents. In case water is used as the reaction solvent, tris(2-carboxyethyl)phosphine) hydrochloride can be chosen due to its water solubility.

In a preferred embodiment, the molar ratio of disulfide reducing agent to thiol groups in the liquid wherein the functional component is dissolved is larger than 1, preferably larger than 4 and more preferably larger than 8. Experiments have demonstrated that an increasing amount of disulfide reducing agent compared to the amount of thiol groups may considerably increase the conversion of the anchor groups.

In a further preferred embodiment, the liquid wherein the functional component is dissolved comprises, per gram equivalent alkene and/or alkyne groups in the polymeric material, at least 1, preferably at least 3, more preferably at least 6 and most preferably at least 9 moles of thiol groups. Experiments have demonstrated that a larger excess of thiol groups, enables to increase the conversion of the anchor groups.

In the method according to the present invention, the functionalisation reaction is preferably performed until at least 30%, preferably at least 50%, more preferably at least 70% and most preferably at least 80% of said alkyne and/or alkene groups are converted by reaction with said thiol groups. These conversion percentages are even achieved in less than 24 hours.

The reaction can be initiated by adding a free-radical initiator to the solution containing the functional component. This initiator can be a photo-initiator or a thermal initiator, initiating the radicalar reaction respectively under influence of radiation (UV/VIS or IR) or of heat. Since the polymeric material is a solid material wherein radiation can only partially penetrate, the reaction is preferable initiated in the method of the present invention by adding a thermal initiator and by heating. The initiator concentration and the reaction temperature can be selected to achieve an optimal balance between initiation and termination rates to achieve a maximum conversion.

In the method of the present invention use is made of a thermoset isocyanate-based polymeric solid material, in particular a polyurethane, a polyurea or a polyurea modified polyurethane material. This polymeric material is a thermoset material since it comprises physically and/or chemically crosslinked polymer chains made of isocyanate and isocyanate reactive components. To provide the anchor groups in the polymeric material, at least one of these reactive components comprises an anchor component which contains at least one terminal alkene and/or alkyne anchor group. Due to the fact that the polymer chains are crosslinked (since the polymeric material is a thermoset material), the polymeric material cannot be dissolved so that bonding the functional component, contained in a solution, to such solid material, is a heterogeneous reaction. Moreover, the anchor groups that allow to covalently bind this functional component, are not only situated on the surface of the solid polymeric material, but are incorporated in the polymer backbone.

An isocyanate-based polymeric material is generally produced by reacting a polyisocyanate component with at least one isocyanate reactive component. The isocyanate reactive component may consist for example of water but is usually a component containing for example hydroxyl, amine and/or thiol groups. The isocyanate-based polymeric material may thus be a polyurea material, a polyurea-modified polyurethane material or a polyurethane material. The following description is given with reference to a polyurethane material but is also applicable to polyurea or polyurea-modified polymeric materials.

The reactive mixture comprises at least one anchor component, which contains at least one anchor group comprising a terminal alkene and/or alkyne group, and at least one reactive group which reacts during the polymerisation process with one of the polyurethane reaction components. The anchor group enables to covalently bind a functional component, anchoring it thus to the polymeric material, whilst said reactive group enables the anchor component to build it in the polymeric structure. The anchor component preferably comprises at least two said reactive groups, whereby it functions as chain extender or crosslinker, enabling to build in larger amounts of it in the polymeric material, without affecting the mechanical properties thereof.

The anchor component according to the invention can be a terminal alkene or alkyne containing isocyanate having at least one but preferably at least two isocyanate groups. It may be the main polyisocyanate component, but is however preferably used in combination with one or more further polyisocyanate components.

In another embodiment, the anchor component can be a terminal alkene or alkyne containing component, comprising at least one, but preferably at least two isocyanate reactive hydrogen atoms being preferably part of a hydroxyl group, an amine group or of a thiol group. Typical examples are hex-5-ene-1,2-diol, 3-allyloxy-1,2-propanediol, 7-octene-1,2-diol, tricyclo(4.2.1.0(2,5))non-7-ene-3,4-diol, trimethylolpropane monoallylether (TMPME).

In this embodiment it may be the main isocyanate reactive component, in particular a relatively high molecular weight polyol component comprising several anchor groups, but it is preferably used with at least one further isocyanate reactive component. To achieve the required crosslinking, at least one of the reactive components comprises at least three reactive groups which participate in the polymerisation reaction. Preferably, at least one of the isocyanate reactive components comprises at least three isocyanate reactive groups.

The anchor component may further also contain more than one anchor group so that in this way also a larger amount of the functional component can be covalently bound to the polymeric material. An example of an anchor component having two anchor groups is 1,5-hexene-3,4-diol. The amount of alkene or alkyne groups on the polymeric material is dependent upon the used amount of the alkene or alkyne containing anchor component and on the alkene or alkyne content thereof. The obtained polyurethane material is suitable for producing a functionalised polyurethane material, by allowing to covalently bind at least one functional component, which comprises a thiol group, to said material by the thiol-ene or thiol-yne radicalar addition reaction between said anchor group and said thiol group.

Besides the advantage that the functional component is added to the polymeric material in a post-polymerisation reaction, so that there is no interference of the polymerisation reaction, and that there are no leaching problems because of the covalent bond between the functional component and the polymeric material, the main advantage of the method according to the invention is that use is made of the thiol-ene or thiol-yne free radicalar addition reaction to covalently bind the functional component, without the presence of a catalyst.

The polyurethane material can be a cellular material, in particular a foam material. It may be prepared in different ways, such as according to the one-shot or the prepolymer (NCO-group containing prepolymers and/or OH-group containing prepolymers) or semi-prepolymer foam making technologies, which are all well-known to the skilled man. Besides the polyisocyanate and the isocyanate reactive components, a blowing agent is added, such as a physical blowing agent or a chemical blowing agent like water, or a combination of both. Depending upon the amount of blowing agent, the cellular properties and hence the density of the obtained polyurethane material will vary between a low density cellular material (density lower than 25 kg/m$^3$) and a high density cellular material (density lower than 400 kg/m$^3$). When substantially no blowing agent is used, a microcellular or non-cellular material is obtained with a density higher than or equal to 400 kg/m$^3$. Auxiliary agents are usually added, such as catalysts, cell-openers, surfactants, fillers, colorants . . . . A proper selection of all these components as well as of the polyurethane making technology will enable to tailor the desired properties of the obtained polyurethane material.

Suitable polyisocyanates include, but are not limited to, aromatic polyisocyanates (which are for example industrially readily available such as TDI, MDI), modified polyisocyanates, aliphatic polyisocyanates such as IPDI and HMDI, or prepolymers of the above mentioned isocyanates.

Suitable components as isocyanate reactive components, are preferably polyols, for example polyether polyols or polyester polyols or mixtures thereof, in which the polyol preferably contains on average at least two hydroxyl groups per molecule, or OH-containing prepolymers thereof. Catalysts which are known and are conventional in polyurethane chemistry can be used in accordance with the present invention.

In one embodiment of the invention, the obtained polyurethane material is a solid material and more particularly a foam material. Depending of the application of the functionalised polyurethane foam, such as heavy metal absorption of polluted water, it may be desirable that the produced polyurethane foam material is enabled to react through its whole matrix with the functional component, so that the loading thereof is maximal. For this purpose, the polyurethane foam material is preferably open-celled in order to enhance the availability of the anchor groups to react with the functional components. Open-celled polyurethane foams with 100% open cells can be obtained by a reticulation process, wherein substantially all of the cell windows are destroyed by a thermal, mechanical or chemical method. The availability of the anchor groups to the functional components will further be determined by the specific surface of the foam (m$^2$/g foam). A reduction of the cell size will result in a higher specific surface, and thus in an increased availability of the anchor groups, enabling more functional components to be bound to the polyurethane foam. The characteristics of the foam material such as cell size and density are selected as a function of the final application of the functionalised produced polyurethane foam.

In another embodiment, the obtained polyurethane material is also a solid material more particularly a high density microcellular or non-cellular material with a density >400 kg/m³. Formulations for producing such materials are for example disclosed in EP0929586B1 and in EP0379246B1. The polyurethane materials produced in accordance with these patents are mainly used in the automotive industry, for example for window encapsulations but especially also for interior trim parts such as dashboards, consoles, glove compartments, door covers etc. For these applications, the requirements being imposed on these polyurethane materials have become more stringent, especially with regard to the surface characteristics, such as tactile feel, dirt sensitivity, abrasion resistance, colour, light stability . . . . According to the method of the invention, an alkene and/or alkyne containing anchor component can be added to the formulation for preparing the polyurethane elastomer. In order to obtain the desired surface characteristics of the elastomer, the produced polyurethane elastomer can be further treated with a thiol derivative of a functional component, such as a fluorochemical compound.

In the above described embodiments, the polymeric material is a solid material. To functionalise this material, it is brought in contact with the functional component which is in a liquid form. The functional component may in particular be a liquid or may be dissolved or dispersed (suspended or emulsified) in a liquid. The solid polymeric material may be impregnated (either superficially or also deeper) with this liquid functional component, in particular by dipping, spraying or by contact impregnation (for example brushing or stamping).

The polymeric solid material does not need to be a homogeneous solid material but may also be a heterogeneous solid material such as a gel.

EXAMPLES

Synthesis of Polyurethane Foams

Example 1

Table 1, Ref 1, 2, 3

All the synthesized PU foams were made in a size of 10×10×10 cm and the formulation was calculated on the basis of a density around 45.4 kg/m³.

In a recipient, the two different polyols (Lupranol VP9349 and Lupranol 2084) were mixed with the solid dialkyne diol 2,2-di(prop-2-ynyl)propane-1,3-diol (DPPD). The complete dissolution was ensured by heating the mixture in an oven at 80° C. until a homogeneous liquid mixture was obtained. Thereafter, a surfactant (Niax L620) and a catalyst (Dabco 33LV) were added. After premixing, the tin catalyst (stannous octoate) was added to the mixture, shortly mixed and finally, the TDI was immediately introduced for the foaming reaction. After the foaming reaction, the PU foam was cured in the oven for 15 minutes. In Table 3 the different formulations used in the foam processing are reported.

Example 2

Table 1, Ref 4

All the synthesized PU foams were made in a size of 10×10×10 cm and the formulation was calculated on the basis of a density around 45.4 kg/m³.

In a recipient, the two different polyols (Lupranol VP9349 and Lupranol 2084) were mixed with the solid dialkene diol trimethylolpropane monoallylether (TMPME). Afterwards, the other components were added such as the surfactant Niax L620, water and catalyst Dabco 33LV. After premixing, the tin catalyst SO is added to the mixture, shortly mixed and finally, the TDI is immediately introduced for the foaming reaction. After the foaming reaction, the PU foam was cured in the oven for 15 minutes. In Table 3 the different formulations used in the foam processing are reported.

TABLE 1

Compositions of each formulation of PU foams

| Ref. | Lupranol VP9349 (g) | Lupranol 2084 (g) | TDI (g) | Water (g) | Diol used/ quantity (g) | Loading [a] (mmol/g) |
|---|---|---|---|---|---|---|
| 1 | 70 | 30 | 36 | 2.3 | DPPD/3.5 | 0.3 |
| 2 | 50 | 50 | 56 | 3 | DPPD/15 | 1.1 |
| 3 | 50 | 50 | 49 | 3 | DPPD/10 | 0.7 |
| 4 | 60 | 40 | 68 | 3.2 | PBM/25 | 0.7 |

0.4 g of Dabco 33LV, 1.2 g Niax L620, 2.3 or 3 g water and 0.12 g of SO were added in each formulation.
[a] Alkyne or alkene theoretical loadings in the materials.

With each of the formulations indicated in Table 1 the same foam properties could be achieved and the effect of the alkyne or alkene diols was hardly noticeable on the processability, reactivity and physical properties. Also the air permeability and the foam structure could be maintained by an appropriate control of the foam process.

Functionalisation Reaction onto Alkene- or Alkyne-Based Polyurethane Foams

In examples 3 to 6, the disappearance of the thiol compounds in the reaction mixture was followed by off-line ¹H-NMR.

Example 3

In a round-bottom flask, the alkene-functionalised polyurethane foam (Reference 4, Table 1, 1 equivalent of alkene functions) was charged with benzyl mercaptane (BM) (1.2 equivalents), acetone-d6, thermal initiator V70 (=2,2'-azobis-(2,4-dimethyl-4-methoxyvaleronitrile)) (in a concentration of 0.039 mol/l) and disulfide reducing agent tributylphosphine (TBP) (12 equivalent according the alkene content). The reaction was allowed to stir at different temperatures for 20 hours. Conversion of the reaction was followed by ¹H-NMR. Temperature has been varied in order to define optimal reaction temperature.

TABLE 2 results of thiol-ene reactions onto alkene-based foam, variation of reaction temperature

| Comp. 1 | Loading (mmol/g) | Comp. 2 | Amount of comp. 2 | Temp. | time | Conv. | time | Conv. |
|---|---|---|---|---|---|---|---|---|
| TMPME foam | 0.7 | benzyl mercaptane | 1.2 eq | Room T | 6 h | 0% | 20 h | 0% |

TABLE 2-continued results of thiol-ene reactions onto alkene-based foam, variation of reaction temperature

| Comp. 1 | Loading (mmol/g) | Comp. 2 | Amount of comp. 2 | Temp. | time | Conv. | time | Conv. |
|---|---|---|---|---|---|---|---|---|
| TMPME foam | 0.7 | benzyl mercaptane | 1.2 eq | 30° C. | 6 h | 14% | 20 h | 27% |
| TMPME foam | 0.7 | benzyl mercaptane | 1.2 eq | 40° C. | 6 h | 44% | 20 h | 62% |
| TMPME foam | 0.7 | benzyl mercaptane | 1.2 eq | 50° C. | 6 h | 47% | 20 h | 48% |

Example 4

Same as example 3, except the reaction temperature has been set on 40° C. and the amount of reducing agent, the amount of initiator and the amount of thiol-compound has been varied.

TABLE 3 results of thiol-ene reactions onto alkene-based foam, variation of amount of reducing agent, amount of initiator and amount of thiol compound

| Comp. 1 | Loading (mmol/g) | Comp. 2 | Amount of comp. 2 | Reducing agent/ thiol compound | Amount of initiator | time | Conv. |
|---|---|---|---|---|---|---|---|
| TMPME foam | 0.7 | benzyl mercaptane | 1.2 eq | 1 | 0.039 mol/l | 20 h | 38% |
| TMPME foam | 0.7 | benzyl mercaptane | 1.2 eq | 10 | 0.039 mol/l | 20 h | 62% |
| TMPME foam | 0.7 | benzyl mercaptane | 1.2 eq | 10 | 0.013 mol/l | 20 h | 40% |
| TMPME foam | 0.7 | benzyl mercaptane | 1.2 eq | 10 | 0.07 mol/l | 20 h | 48% |
| TMPME foam | 0.7 | benzyl mercaptane | 9 eq | 10 | 0.039 mol/l | 20 h | 93% |

Example 5

Same as examples 3 and 4, reaction temperature has been set on 40° C., amount of reducing agent on 12 eq and initiator concentration 0.039 mol/l. The initiation method has been varied: thermal initiation with thermal initiator V70, photo-initiation by UV-light with dimethoxy-2-phenylacetophenone (DMPA) and photo-initiation with VIS-light with camphorquinone. In case of photo-initiation, methanol-d4 has been used as reaction solvent. In the reaction with VIS-light 4-methoxy-alpha-toluenethiol (MTT) has been used as thiol-compound.

TABLE 4 results of thiol-ene reactions onto alkene-based foam, variation of initiator

| Comp. 1 | Loading (mmol/g) | Comp. 2 | Amount of comp. 2 | Initiator | Solvent | time | Conv. |
|---|---|---|---|---|---|---|---|
| TMPME foam | 0.7 | benzyl mercaptane | 1.2 eq | V70 | Acetone-d6 | 20 h | 62% |
| TMPME foam | 0.7 | benzyl mercaptane | 1.2 eq | DMPA | Methanol-d4 | 20 h | 53% |
| TMPME foam | 0.7 | MTT | 1.2 eq | Camphor-quinone | Methanol-d4 | 20 h | 40% |

Example 6

In a round-bottom flask, the alkyne-functionalised polyurethane foam (Reference 3, Table 1, 1 equivalent of alkyne functions) was charged with benzyl mercaptane (BM) (2.4 equivalents) (or MTT in case of use of VIS light), acetone-d6 (or methanol-d4 in case of photo-initiation), thermal initiator V70 or photo-initiators DMPA or camphorquinone (in a concentration of 0.039 mol/l) and disulfide reducing agent tributylphosphine (TBP) (molar ratio reducing agent/thiol compound of 10). The reaction was allowed to stir at 40° C. (or VIS or UV light) for 20 hours. Conversion of the reaction was followed by $^1$H-NMR.

TABLE 5 results of thiol-ene reactions onto alkyne-based foam

| Comp. 1 | Loading (mmol/g) | Comp. 2 | Amount of comp. 2 | T | initiator | time | Conv. |
|---|---|---|---|---|---|---|---|
| DPPD foam | 0.7 | benzyl mercaptane | 2.4 eq | 40° C. | V70 | 20 h | 35% |
| DPPD foam | 0.7 | benzyl mercaptane | 2.4 eq | 50° C. | V70 | 20 h | 33% |
| DPPD foam | 0.7 | benzyl mercaptane | 18 eq | 40° C. | V70 | 20 h | 98% |
| DPPD foam | 0.7 | 4-methoxy-alpha-toluenethiol | 2.4 eq | VIS light | Camphor-quinone | 20 h | 35% |
| DPPD foam | 0.7 | 4-methoxy-alpha-toluenethiol | 2.4 eq | UV light | DMPA | 20 h | 43% |

TABLE 6

Compositions of each formulation of PU films

| Ex. | DPPD (g) | TMPME (g) | Desmophen 41WB01 (g) | IPDI (g) | Loading |
|---|---|---|---|---|---|
| 1 | 36 | — | 64 | 57 | 3 mmol/g |
| 2 | — | 30 | 70 | 36.3 | 2.11 mmol/g |
| 3 | — | 50 | 50 | 13.4 | 1.72 mmol/g |

IPDI: isophorone diisocyanate

Synthesis of Polyurethane Films

Example 7

Table 6, Ref 1

The solid dialkyne diol 2,2-di(prop-2-ynyl)propane-1,3-diol (DPPD) has been added to the pure trifunctional polyol with a molecular weight of 4500. The mixture was heated at 120° C. till all the DPPD was melted. After melting, the polyol blend was cooled down. Catalyst Bismuth neodecanoate (metal catalyst) and isocyanate IPDI were added and mixed using a glass rod. The reaction mixture was fastly poured on a recipient and put in an oven at 100° C. for 30' for curing. Theoretical loading is 3 mmol alkyne/g material.

Example 8

Table 6, Ref 2

Same as example 7. A trifunctional polyol with molecular weight of 4500 was mixed with the alkene diol trimethylolpropane monoallylether (TMPME). After stirring, UL28 (dimethyltinneodecanoate) was added as catalyst followed by addition of the IPDI (isophorone diisocyanate). The reaction mixture was fastly poured in another glass recipient and the PU film was further cured at 100° C. for 2 h to complete the reaction. Theoretical loading is 1.72 mmol alkene/g material.

Functionalisation Reaction onto Alkene- or Alkyne-Based Polyurethane Films

Example 9

In a round-bottom flask, the alkyne-functionalised polyurethane film (Example 1, Table 7, 1 equivalent of alkyne functions) was charged with benzyl mercaptane (2.4 equivalents), acetone-d6, thermal initiator V70 (in a concentration of 0.039 mol/l) and disulfide reducing agent tributylphosphine (TBP) (molar ratio TBP/BM=10). The reaction was allowed to stir under air atmosphere at 40° C. for 20 hours. Conversion of the reaction was followed by $^1$H-NMR. The conversion after 20 h was 31%.

Example 10

In a round-bottom flask, the alkene-functionalised polyurethane film (Example 2, Table 7, 1 equivalent of alkyne functions) was charged with benzyl mercaptane (2.4 equivalents), acetone-d6, thermal initiator V70 (in a concentration of 0.039 mol/l) and disulfide reducing agent tributylphosphine (TBP) (molar ratio TBP/BM=10). The reaction was allowed to stir under air atmosphere at 40° C. for 20 hours. Conversion of the reaction was followed by $^1$H-NMR. The conversion after 20 h was 48%.

The invention claimed is:

1. A method for functionalising a thermoset, crosslinked isocyanate-based polymeric solid material, which material is made of isocyanate and isocyanate reactive components, at least one of which comprises an anchor component which has at least one anchor group, in which method the solid material is brought in contact with a liquid containing at least one functional component which is allowed to bind covalently to this solid material by a heterogeneous reaction between the functional component contained in said liquid and the anchor groups on undissolved, solid material, characterized in that the anchor groups on said solid material comprise terminal alkene and/or alkyne groups and said functional component comprises at least one thiol group, said functional component being allowed to bind covalently to said solid material by a heterogeneous, free-radical addition reaction between the thiol groups on the functional component and the terminal alkene and/or alkyne anchor groups on the undissolved, solid material.

2. A method according to claim 1, characterized in that said free radical addition reaction is initiated by adding a free-radical initiator to said liquid.

3. A method according to claim 1, characterized in that said free radical addition reaction is initiated by means of radiation or by heating.

4. A method according to claim 1, characterized in that said free radical addition reaction is performed at a temperature of between 30 and 50° C.

5. A method according to claim 1, characterized in that said liquid comprises, per gram equivalent alkene and/or alkyne groups in the polymeric material, at least 1 mole of thiol groups.

6. A method according to claim 1, characterized in that said solid material is a foam having a density lower than 400 kg/m$^3$.

7. A method according to claim 6, characterized in that said foam material has a cell size, determined according to the Visiocell method, of at least 0.2 mm.

8. A method according to claim 6, characterized in that said foam material has a cell size, determined according to the Visiocell method, of at least 0.4 mm.

9. A method according to claim 6, characterized in that said foam material has a cell size, determined according to the Visiocell method, of at least 0.6 mm.

10. A method according to claim 1, characterized in that said solid material is an open-cell foam material.

11. A method according to claim 1, characterized in that said isocyanate-based polymeric material has a density higher than 400 kg/m$^3$.

12. A method according to claim 11, characterized in that said isocyanate-based polymeric material is a non-cellular or micro-cellular elastomeric material.

13. A method according to claim 11, characterized in that said isocyanate-based polymeric material is a gel.

14. A method according to claim 1, characterized in that said reactive components comprise at least one reactive component having at least three isocyanate reactive groups.

15. A method according to claim 1, characterized in that the solid material is brought in contact with the liquid which contains said functional component by impregnating said solid material with said liquid.

16. A method according to claim 1, characterized in that the liquid containing said functional component, comprises a disulfide reducing agent.

17. A method according to claim 1, characterized in that said free radical addition reaction is initiated by means of UV or IR radiation.

18. A method according to claim 1, characterized in that said free radical addition reaction is performed at a temperature higher than 35° C. and lower than 45° C.

19. A method according to claim 1, characterized in that said liquid comprises, per gram equivalent alkene and/or alkyne groups in the polymeric material, at least 6 moles of thiol groups.

20. A method according to claim 1, characterized in that said liquid comprises, per gram equivalent alkene and/or alkyne groups in the polymeric material, at least 9 moles of thiol groups.

21. A method according to claim 1, characterized in that said solid material is an open-cell foam material, having an open cell content of at least 90%.

22. A method according to claim 1, characterized in that said solid material is an open-cell foam material, having an open cell content of at least 95%.

23. A method according to claim 1, characterized in that the liquid containing said functional component, comprises a reducing agent.

24. A method according to claim 23, characterized in that the molar ratio of reducing agent to thiol groups in said liquid is larger than 1.

25. A method according to claim 23, characterized in that the molar ratio of reducing agent to thiol groups in said liquid is larger than 4.

26. A method according to claim 23, characterized in that the molar ratio of reducing agent to thiol groups in said liquid is larger than 8.

27. An isocyanate-based polymeric, crosslinked solid material which is functionalised by a method according to claim 1.

* * * * *